(12) United States Patent
Scheit et al.

(10) Patent No.: US 10,960,823 B2
(45) Date of Patent: Mar. 30, 2021

(54) MOTOR VEHICLE COMPRISING A RECEIVING COMPARTMENT

(71) Applicant: Volkswagen Aktiengesellschaft, Wolfsburg (DE)

(72) Inventors: Steffen Scheit, Bahrdorf (DE); Dirk Frommholz, Gifhorn (DE); Axel Kleine, Seesen (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 126 days.

(21) Appl. No.: 16/535,883

(22) Filed: Aug. 8, 2019

(65) Prior Publication Data

US 2020/0047676 A1  Feb. 13, 2020

(30) Foreign Application Priority Data

Aug. 8, 2018 (DE) ..................... 10 2018 213 366.2

(51) Int. Cl.
*B60R 19/34* (2006.01)
*B60R 7/04* (2006.01)
(Continued)

(52) U.S. Cl.
CPC ................ *B60R 7/04* (2013.01); *E05B 83/32* (2013.01); *B60N 2/04* (2013.01); *B60N 2/20* (2013.01); *E05Y 2900/538* (2013.01)

(58) Field of Classification Search
CPC ....... Y02T 10/64; Y02T 10/72; Y02T 10/645; Y02T 10/70; B60L 2200/26; B60P 3/08;
(Continued)

(56) References Cited

U.S. PATENT DOCUMENTS 4,999,599 A * 3/1991 Spier ..................... H01H 36/00
335/205
5,890,756 A * 4/1999 Pranger ................... B60N 3/08
224/281
(Continued)

FOREIGN PATENT DOCUMENTS

DE  195 39 066 A1  11/1996
DE  198 17 346 A1  10/1999
(Continued)

*Primary Examiner* — Kiran B Patel
(74) *Attorney, Agent, or Firm* — Muncy, Geissler, Olds & Lowe, P.C.

(57) ABSTRACT

A motor vehicle having a receiving compartment, which is mounted on a vehicle console, pivotable around a vertical axis, in the area of a side wall of the vehicle console delimiting an occupant footwell of the motor vehicle. It is provided that, with regard to a line of vision, oriented in the vehicle longitudinal direction of a vehicle occupant located on a seat of the motor vehicle assigned to the relevant occupant footwell, the vertical axis is arranged on an end or end section of the receiving compartment situated counter to the aforementioned line of vision, and the receiving compartment is mounted on the vehicle console in such a way, pivotable around the aforementioned vertical axis, and is positioned in the open state in such a way, that the open receiving compartment is oriented obliquely with respect to a displacement direction of the aforementioned seat.

11 Claims, 2 Drawing Sheets

(51) Int. Cl.
*E05B 83/32* (2014.01)
*B60N 2/04* (2006.01)
*B60N 2/20* (2006.01)

(58) Field of Classification Search
CPC ....... G07B 15/063; B62D 1/28; G01S 13/931; G01C 21/28
See application file for complete search history.

(56) References Cited

U.S. PATENT DOCUMENTS

| | | | | |
|---|---|---|---|---|
| 5,970,814 | A * | 10/1999 | Smith | B60K 20/04 224/539 |
| 6,038,937 | A * | 3/2000 | Van Order | F16H 59/105 200/61.85 |
| 6,497,441 | B1 * | 12/2002 | Mahmood | B60N 2/2854 224/400 |
| 7,111,883 | B1 * | 9/2006 | Patel | B60R 7/04 296/24.34 |
| 8,573,668 | B2 * | 11/2013 | Miklas | B60N 3/10 296/37.1 |
| 9,079,540 | B2 | 7/2015 | Harding | B60R 11/02 |
| 9,238,440 | B1 * | 1/2016 | Bowser | B60R 7/084 |
| 9,283,890 | B1 * | 3/2016 | Huebner | B60R 7/04 |
| 10,875,458 | B2 * | 12/2020 | Persson | B60R 7/04 |
| 10,899,263 | B2 * | 1/2021 | Schnur | B60N 3/08 |
| 2004/0066053 | A1 * | 4/2004 | Fero | B60R 7/06 296/37.8 |
| 2005/0062320 | A1 * | 3/2005 | Duerr | B60N 3/10 297/188.19 |
| 2007/0075558 | A1 * | 4/2007 | Kim | B60N 2/793 296/24.34 |
| 2007/0119885 | A1 * | 5/2007 | Miller | B60R 7/04 224/275 |
| 2007/0152461 | A1 * | 7/2007 | Joler | B60R 7/04 296/24.34 |
| 2008/0150309 | A1 * | 6/2008 | Norman | B60R 7/04 296/37.8 |
| 2011/0042972 | A1 * | 2/2011 | Penner | E05B 85/18 292/336.3 |
| 2011/0272959 | A1 * | 11/2011 | Lupton, III | H01R 13/60 296/37.8 |
| 2013/0193706 | A1 * | 8/2013 | Minelli | B60R 11/02 296/37.8 |
| 2014/0197657 | A1 * | 7/2014 | Gillis | B60R 7/04 296/37.8 |
| 2014/0292015 | A1 * | 10/2014 | Lambert | B60R 11/0241 296/37.8 |
| 2014/0347796 | A1 * | 11/2014 | Isquierdo | H05K 5/0226 361/679.01 |
| 2015/0035308 | A1 * | 2/2015 | Huebner | B60R 11/0252 296/37.8 |
| 2017/0001570 | A1 * | 1/2017 | Murray | B60R 7/04 |
| 2017/0067274 | A1 * | 3/2017 | Yano | E05C 9/02 |
| 2017/0246973 | A1 * | 8/2017 | Farooq | B60R 7/04 |
| 2018/0162283 | A1 * | 6/2018 | Ranganathan | B60R 7/043 |
| 2019/0092243 | A1 * | 3/2019 | Perez | B60R 11/02 |
| 2019/0111850 | A1 * | 4/2019 | Vanel | B60R 7/04 |
| 2019/0248294 | A1 * | 8/2019 | Persson | B60R 7/04 |
| 2019/0315258 | A1 * | 10/2019 | Johns | E05D 3/125 |
| 2019/0337459 | A1 * | 11/2019 | Liu | E05F 5/06 |
| 2019/0381943 | A1 * | 12/2019 | Hornischer | E05D 15/22 |
| 2020/0071984 | A1 * | 3/2020 | Fukui | E05B 83/32 |
| 2020/0223366 | A1 * | 7/2020 | Heinz | B60R 7/04 |
| 2020/0231077 | A1 * | 7/2020 | Schnur | B60N 3/101 |
| 2020/0269741 | A1 * | 8/2020 | Koarai | B60R 7/06 |
| 2020/0353871 | A1 * | 11/2020 | Leuenberger | B60R 7/04 |
| 2020/0408005 | A1 * | 12/2020 | Santillan gutierrez | B60R 7/04 |
| 2020/0408013 | A1 * | 12/2020 | Hodgson | B60R 7/04 |

FOREIGN PATENT DOCUMENTS

| | | |
|---|---|---|
| DE | 10 2011 100 667 A1 | 11/2012 |
| DE | 10 2015 001 688 A1 | 8/2015 |

\* cited by examiner

MOTOR VEHICLE COMPRISING A RECEIVING COMPARTMENT

This nonprovisional application claims priority under 35 U.S.C. § 119(a) to German Patent Application No. 10 2018 213 366.2, which was filed in Germany on Aug. 8, 2018, and which is herein incorporated by reference

BACKGROUND OF THE INVENTION

Field of the Invention

The present invention relates to a motor vehicle comprising a receiving compartment.

Description of the Background Art

A receiving console for a handheld operating element in a vehicle interior is known from DE 195 39 066 A1, which is arranged on a side wall of a transmission tunnel and may be folded out laterally in the direction of a passenger footwell. This is intended to permit a problem-free accessibility to the handheld operating element as well as a concealed accommodation thereof by folding in the receiving console holding the handheld operating element. The receiving console is arranged at the height of a receiving shaft of a car radio and is mounted on the transmission tunnel, pivotable around a vertical axis arranged on the vehicle front side of the receiving console.

DE 198 17 346 A1 discloses a vehicle console, in particular a center console, which comprises a holding device for a car phone. The holding device is pivotable around a pivot axis out of a side wall of the vehicle console on the passenger side.

The need exists to pivotably arrange a receiving compartment on the vehicle console in the area of an occupant footwell, in particular a passenger footwell, relatively far down near a seat assigned to the occupant footwell, in particular a passenger seat, for the purpose of making it more comfortable to handle the receiving compartment as well as any object accommodated therein, such as an electronic mobile device, for a vehicle occupant located on the aforementioned seat, in particular the aforementioned passenger seat.

A receiving compartment for a mobile device arranged in an interior of a motor vehicle and designed as a fold-out compartment is thus known from DE 10 2015 001 688 A1, the receiving compartment being arranged within an opening in a side wall of a center console of the motor vehicle delimiting an occupant footwell of the motor vehicle and being pivotable into the occupant footwell around a pivot axis. The pivot axis is arranged on a lower edge of the receiving compartment and extends obliquely upwardly at a certain angle, viewed from the back of the vehicle toward the front of the vehicle.

However, this pivot arrangement of the receiving compartment involves the risk that the pivoted-out receiving compartment enters a displacement area of a seat which is displaceable in the vehicle longitudinal direction (x direction), in particular a passenger seat, of the motor vehicle, and during a possible displacement of the displaceable seat, the latter collides with the pivoted-out receiving compartment, possibly accompanied by damage, in particular, to the receiving compartment. This is where the invention described below comes in.

SUMMARY OF THE INVENTION

It is therefore an object of the present invention to provide a motor vehicle comprising an improved receiving compartment with regard to the prior art, which takes into account, in particular, the disadvantageous circumstance described above.

According to an exemplary embodiment of the invention, based on a motor vehicle comprising a receiving compartment, which is mounted on a vehicle console, pivotable around a vertical axis, in the area of a side wall of the vehicle console delimiting an occupant footwell of the motor vehicle, the receiving compartment being movable back and forth from a first operating position, in which the receiving compartment is arranged within an opening in the side wall of the vehicle console, into a second operating position, in which the receiving compartment projects into the aforementioned occupant footwell, the object is achieved in that, with regard to a line of vision oriented in the vehicle longitudinal direction (x direction) of a vehicle occupant located on a seat of the motor vehicle assigned to the relevant occupant footwell, the vertical axis is arranged on an end or end section of the receiving compartment situated counter to the aforementioned line of vision, and the receiving compartment is mounted on the vehicle console, pivotable around the aforementioned vertical axis, and is positioned in the open state in such a way that the open receiving compartment is oriented obliquely with respect to a displacement direction of the aforementioned seat.

This ensures that, in the open state, i.e. in the second operating state of the receiving compartment, the latter runs from the aforementioned side wall of the vehicle console, with regard to the line of vision, oriented in the vehicle longitudinal direction (x direction), of the vehicle occupant located on the seat of the motor vehicle assigned to the relevant occupant footwell, into the occupant footwell of a passenger facing toward the front of the vehicle at a certain angle, for example toward the front of the vehicle. This advantageously permits the seat, i.e. the passenger seat, possibly displaced toward the front of the vehicle and assigned to the occupant footwell in the open state of the receiving compartment and possibly contacting the receiving compartment thereby, to slide up, so to speak, on the receiving compartment oriented obliquely with respect to the displacement direction of the seat, with the result that the receiving compartment pivots in the direction of the first operating position without causing damage thereto or impairing its functionality.

However, the invention is not limited to the passenger seat mentioned by way of example, but instead applies to any seat of a motor vehicle, for example including the driver's seat or a seat in a back row of seats, this seat being situated adjacent to a vehicle console, in particular a center console.

Moreover, the invention is also not limited to motor vehicle comprising at least one seat which is arranged in the motor vehicle in such a way that a line of vision, oriented in the vehicle longitudinal direction (x direction), of a vehicle occupant located thereon is directed toward the front of the vehicle, but it also includes motor vehicles comprising at least one seat, which is arranged in the motor vehicle in such a way that a line of vision, oriented in the vehicle longitudinal direction (x direction), of a vehicle occupant located thereon is directed toward the back of the vehicle. The latter seats arranged or arrangeable in the motor vehicle may be used, in particular, in already envisaged or implemented self-driving motor vehicles, in vans and/or in buses, or are already used in the arrangement described.

Accordingly, the receiving compartment is preferably configured to receive an electronic mobile unit, whereby the latter is easily accessible to a vehicle occupant in the motor vehicle, i.e. passenger, located on a seat assigned to the occupant footwell, for example in a passenger seat, and may be comfortably stowed therein.

To even further improve the accessibility of the receiving compartment and, in particular, the ability to look inside it, the aforementioned vertical axis is inclined at a certain angle "a" counter to the aforementioned line of vision of the vehicle occupant.

For this purpose, angle "α" can be selected in such a way that a line of sight of the vehicle occupant, i.e. the passenger, located on the seat of the motor vehicle assigned to the aforementioned occupant footwell, for example in the passenger seat of the motor vehicle, is directed into the interior of the receiving compartment and/or onto a electronic mobile device held therein.

The aforementioned angle "α" can be selected as a function of a defined angle of inclination or a defined range of angles of inclination of a backrest of the seat assigned to the occupant footwell, for example the passenger seat. A defined angle of inclination of the backrest is understood to be, in particular, an angle of inclination which, in the judgment of experts and/or based on empirically collected data, is/becomes predominantly set by a vehicle occupant located on the seat, for example the passenger seat, during the operation of the motor vehicle.

In particular, an angle "α" from of 55° to 65°, preferably 60°, from the vertical has proven to be successful in extensive tests relating to the subject matter of the application.

To ensure an easy and fault-free sliding of the seat assigned to the occupant footwell in the case of a collision with the receiving compartment, the receiving compartment has a cover on the occupant footwell side, which runs flush with the side wall of the vehicle console in the first operating position of the receiving console. In addition, a largely closed surface of the side wall of the vehicle console is established hereby in the closed state of the receiving compartment, i.e. in the first operating position thereof.

To improve, in particular, the occupancy conditions of the vehicle occupant located on the seat assigned to the occupant footwell, for example on the passenger seat, within the vehicle, the cover has a cushion element on the occupant footwell side or is formed by a cushion element. A soft support, in particular of the vehicle console-side knee of the vehicle occupant against the vehicle console is advantageously made possible hereby.

To fix the receiving compartment in the first operating position thereof, a locking pushbutton is assigned to the receiving compartment, which is operatively connected to a locking device of the receiving compartment.

The aforementioned locking pushbutton is preferably situated in the vehicle at a distance from the receiving compartment, whereby an unintentional actuation thereof is prevented, however is at least effectively limited. According to the prior art (DE 198 17 346 A1), in contrast, a so-called push-push mechanism directly on the receiving compartment is favored for unlocking and locking a pivotably mounted receiving compartment. A push-push mechanism is understood to be a mechanism, which is known per se, for locking a tumbler, the tumbler being pressed into a closing engagement position by applying a force against the active direction of the force of a pretensioned tumbler spring during a first application of force, i.e., actuation, and is pressed into an open engagement position after another application of force, i.e. actuation, in the same direction. However, this measure involves the possibility of an unintentional actuation solely by knocking against the aforementioned receiving compartment, in particular if the receiving compartment is pivotably mounted on the vehicle console in the area of the occupant footwell, for example the passenger footwell, relatively far down near a seat assigned to the occupant footwell, for example the passenger seat, and if it is reachable, for example, by a knee of a vehicle occupant located on the seat.

According to an embodiment of the invention, based on a motor vehicle comprising a receiving compartment, which is pivotably mounted on a vehicle console in the area of a side wall of the vehicle console delimiting an occupant footwell of the motor vehicle, and having a cover with an upper edge and a lower edge as well as a side edge, the receiving compartment being movable back and forth from a first operating position, in which it is arranged within an opening in the side wall of the vehicle console, and the opening is closed by the aforementioned cover, into a second operating position, in which the receiving compartment projects into the aforementioned occupant footwell, the object is achieved in that the receiving compartment is mounted on the vehicle console, pivotable around a pivot or vertical axis, the pivot or vertical axis running or being arranged obliquely with respect to at least one side edge of the cover.

This also advantageously ensures that, in the open state of the receiving compartment, i.e. in the second operating state thereof, in which it runs inwardly at a certain opening angle, for example toward the front of the vehicle, a seat which is possibly displaced toward the front of the vehicle and assigned to the occupant footwell and possibly contacting the receiving compartment, i.e., the passenger seat, slides up, so to speak, on the receiving compartment oriented obliquely with respect to the displacement direction of the seat, and as a result, the receiving compartment pivots in the direction of the first operating position without causing any damage thereto or impairing its functionality.

The invention is explained in greater detail below on the basis of one exemplary embodiment illustrated schematically in the drawings. For the purposes of the present description, the normal direction of travel of a motor vehicle is designated by "–x" ("minus x"), the direction opposite its normal direction of travel is designated by "+x" ("plus x"), the direction on the horizontal transversely to the x direction, starting from the normal direction of travel (–x) and viewed to the right, is designated by "+y", the direction on the horizontal transversely to the x direction, starting from the normal direction of travel (–x) and viewed to the left, is designated by "–y", the direction on the vertical transversely to the x direction, viewed upwardly, is designated by "+z", and the direction on the vertical transversely to the x direction, viewed downwardly, is designated by "–z." This way of designating the spatial directions in terms of Cartesian coordinates corresponds to the coordinate system generally used in the automotive industry. Moreover, terms such as "front," "rear," "up," "down," and terms of a similar meaning, including the terms "right" and "left," are used in the same manner as they are normally used for designating direction on a motor vehicle.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
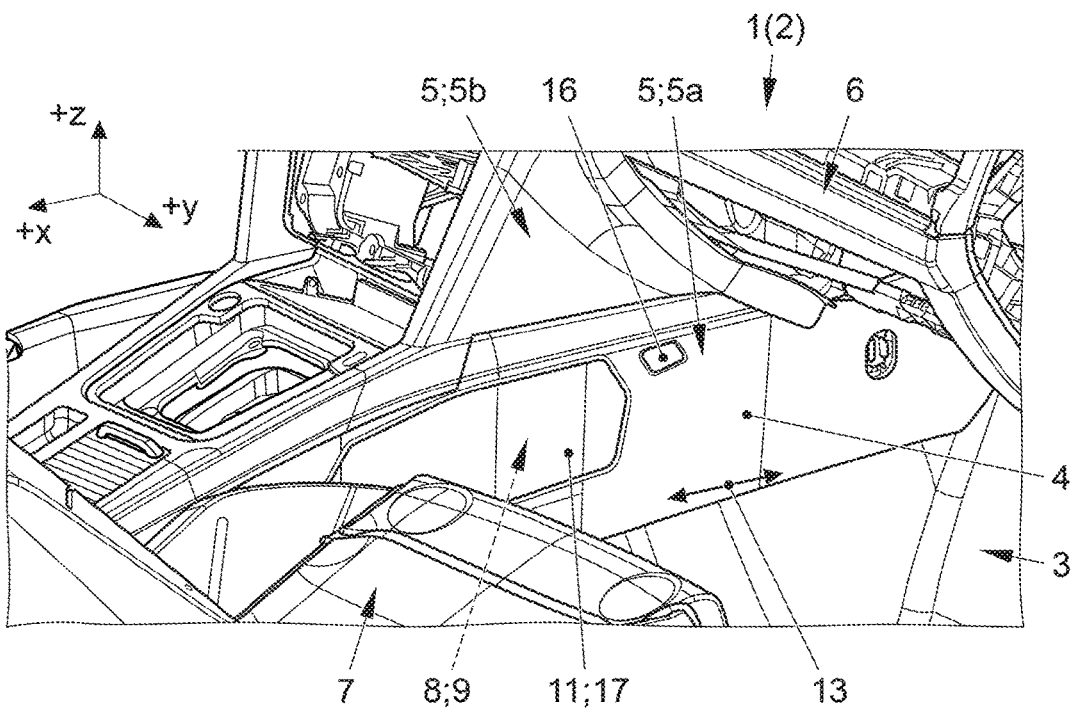
FIG. 1 shows a perspective inner view of the passenger cell of a motor vehicle, with a view of a side wall of a vehicle console (center console) delimiting a passenger footwell of the motor vehicle, as well as a pivotably mounted receiving compartment arranged thereon in a first, closed operating position thereof.
Figure 2:
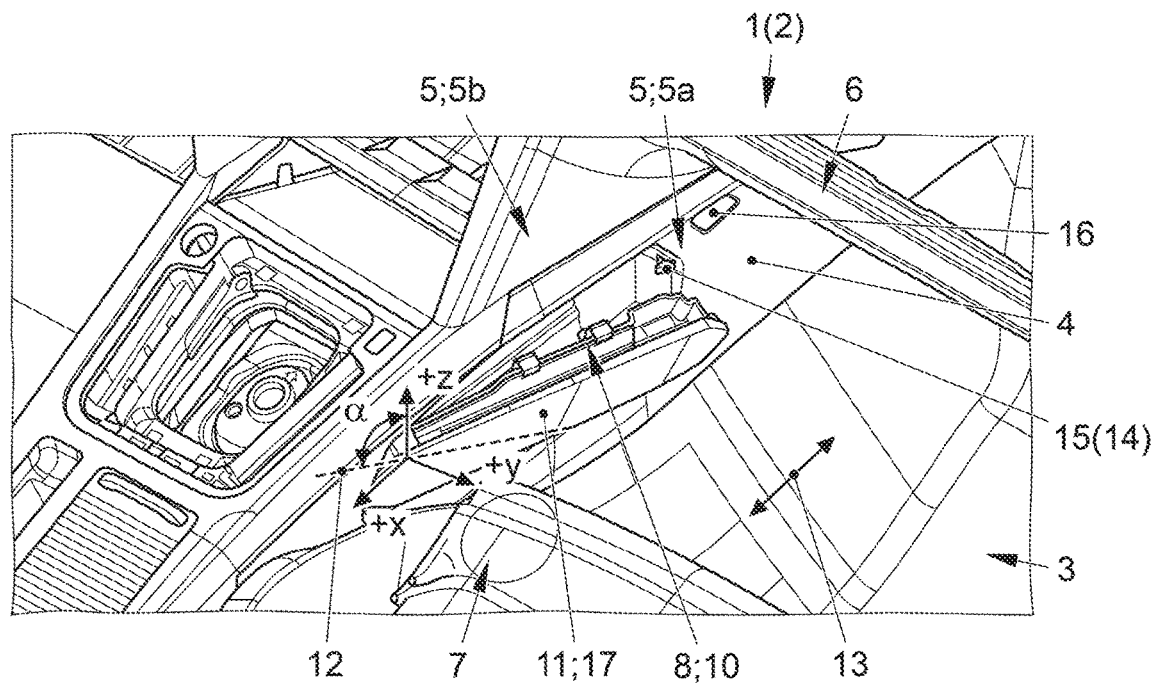
FIG. 2 shows a perspective inner view of the passenger cell according to FIG. 1, with a view from above onto the receiving compartment, which is now in a second, open operating position.
Figure 3:
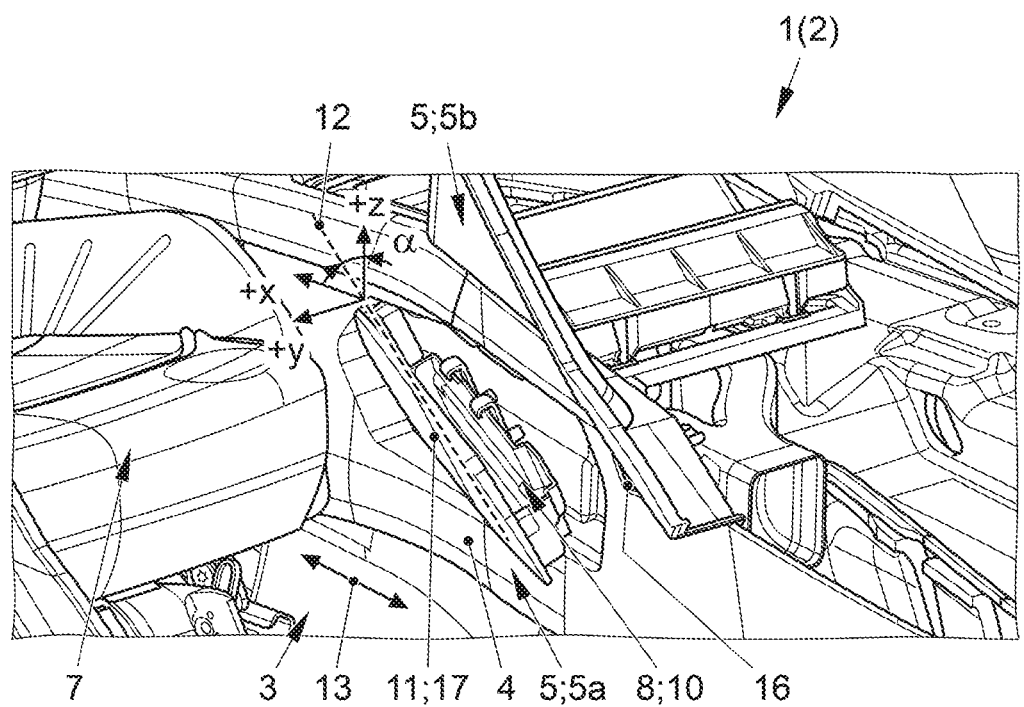
FIG. 3 shows the receiving compartment in a second, open operating position according to FIG. 2, in a perspective view from the front of the vehicle to the back of the vehicle.

FIGS. 1 through 3 show an inner view of passenger cell 1 of a motor vehicle 2 with a view of an occupant footwell 3 thereof designed as a passenger footwell. The aforementioned occupant footwell 3 is delimited toward the middle of the vehicle by a side wall 4 of a vehicle console 5, viewed in the vehicle transverse direction (y direction). In the present case, vehicle console 5 comprises a center console 5a of motor vehicle 2 as well as a console 5b of an instrument panel 6 of motor vehicle 2, which is supported thereon.

According to this exemplary embodiment, in the area of side wall 4 of vehicle console 5, a receiving compartment 8 for one or multiple objects to be stored therein is arranged on side wall 4 in the area of center console 5a relatively far down at the height of a seat 7 of motor vehicle 2, which is designed as a passenger seat. Receiving compartment 8 is pivotably mounted on vehicle console 5 and is able to be moved back and forth from a first operating position 9 (cf. FIG. 1), in which it is arranged within an opening in side wall 4 of vehicle console 5, into a second operating position 10 (cf. FIGS. 2 and 3), in which receiving compartment 8 projects into aforementioned occupant footwell 3. However, the invention is not limited to this specifically selected arrangement of receiving compartment 8 but also includes an arrangement thereof in the area of console 5b of instrument panel 6 or in a transitional area between center console 5a and console 5b of instrument panel 6 (not illustrated in the drawing).

Receiving compartment 8 has a cover 11 on the footwell side, in the present case on the passenger footwell side. In one preferred embodiment of the invention, this cover 11 runs flush with side wall 4 (cf. FIG. 1) in first, closed operating position 9 of receiving compartment 8.

Receiving compartment 8 itself may be designed, for example, as a storage tray (not illustrated in the drawing). However, as illustrated in FIGS. 2 and 3, it is configured to receive an electronic mobile device, which is not illustrated in the drawing, in particular a mobile phone or the like.

As is also apparent in FIGS. 2 and 3, receiving compartment 8 is mounted on vehicle console 5, pivotable around a vertical axis 12, mounted by way of example on center console 5a in the present case, the vertical axis 12 being arranged on the vehicle rear side of receiving compartment 8. The aforementioned vertical axis 12 is understood to be an axis or pivot axis whose main orientation is in the vertical direction of motor vehicle 2, i.e. it runs from bottom to top. However, this vertical axis 12 is not necessarily understood to be the Z axis of motor vehicle 2, i.e. a precisely vertically aligned axis.

Due to the rear-side arrangement of aforementioned vertical axis 12 (pivot axis) of receiving compartment 8, cover 11 of receiving compartment 8 runs, in the open state, i.e. in second operating position 10 thereof, from aforementioned side wall 4 of vehicle console 5 or center console 5a into occupant footwell 3 at a certain opening angle toward the front of the vehicle. If seat 7, i.e. the passenger seat, is displaced, for example, toward the front of the vehicle according to direction arrow 13, seat 7 may possibly contact receiving compartment 8. Seat 7 advantageously slides up, so to speak, on receiving compartment 8 or its cover 11 oriented obliquely to the displacement direction (direction arrow 13) of seat 7, with the result that receiving compartment 8 advantageously continues to pivot unhindered in the direction of first operating position 9.

Receiving compartment 8 is preferably designed to be spring-loaded in the opening direction thereof, which ensures that receiving compartment 8 automatically returns to its second operating position 10 when seat 7 is moved back, unless a locking device 14 of receiving compartment 8 fixes the latter in its first operating position 9. According to this exemplary embodiment, locking device 14 has a tumbler 15 for fixing receiving compartment 8 in first operating position 9 thereof, which, in turn, is operatively connected to a locking pushbutton 16. The aforementioned locking pushbutton 16 is arranged separately, i.e. at a distance from, receiving compartment 8, in the present case on side wall 4 of vehicle console 5 or center console 5a on the vehicle front side of receiving compartment 8.

As is also apparent from FIGS. 2 and 3, aforementioned vertical axis 12 is arranged, inclined toward the back of the vehicle at a certain angle "α". This measure has the advantage of an improved accessibility to and, in particular, ability to see inside receiving compartment 8. Aforementioned angle "α" is selected in such a way that a line of sight, which is not illustrated in the drawing, of a vehicle occupant located on seat 7, in the present case the passenger seat, is directed into the interior of receiving compartment 8 and/or onto an electronic mobile device held therein.

Angle "α" is further preferably selected as a function of a defined angle of inclination or a defined range of angles of inclination of a backrest of seat 7, which is not illustrated in the drawing, this backrest generally influencing the sitting posture and thus also the direction of the aforementioned line of sight of the vehicle occupant located on seat 7. A defined angle of inclination of the backrest is understood to be, in particular, an angle of inclination which, in the judgment of experts and/or based on empirically collected data, is/becomes predominantly set by a vehicle occupant located on seat 7 during the operation of motor vehicle 2. In particular, an angle "α" of 55° to 65°, preferably 60°, from the vertical has proven to be successful in extensive tests relating to the subject matter of the application.

To improve, in particular, the occupancy conditions of the vehicle occupant located on seat 7 in motor vehicle 2, cover 11 has a cushion element 17 on the passenger footwell side. Alternatively, cover 11 may also be formed by the aforementioned cushion element 17. A soft support of the vehicle console-side knee of the vehicle occupant (passenger), the left knee in the present case, against vehicle console 5, center console 5a in the present case, is advantageously made possible hereby.

As explained above, however, the invention is not limited to seat 7 mentioned by way of example in the form of a passenger seat, but applies to any seat 7 of a motor vehicle 2, for example including the driver's seat or a seat 7 in a back row of seats, this seat 7 being situated adjacent to a vehicle console 5, in particular a center console (not illustrated in the drawing).

In addition, with regard to, in particular, already envisaged or implemented self-driving motor vehicles 2 as well as vans and/or buses, the possibility exists of outfitting the latter with at least one seat 7, which is arranged in motor vehicle 2 in such a way that a line of vision, oriented in the vehicle longitudinal direction (x direction), of a vehicle occupant located thereon is directed toward the back of the vehicle (not illustrated in the drawing) and not, as described above, toward the front of the vehicle. Accordingly, a displaceability of seat 7 toward the back of the vehicle from a certain initial position may result herefrom.

In this specific case, within the meaning of the invention, receiving compartment 8 is mounted on vehicle console 5, pivotable around a vertical axis 12, the vertical axis 12 being arranged on a vehicle front-side end or end section of receiving compartment 8. In the open state of receiving compartment 8, the latter runs at a certain opening angle from side wall 4 of vehicle console 5 toward the back of the vehicle into occupant footwell 3 of the vehicle occupant facing the back of the vehicle. If seat 7 is displaced toward the back of the vehicle in the open state of receiving compartment 8, and if it possibly contacts open receiving compartment 8, seat 7 slides up, so to speak, on receiving compartment 8, which is oriented obliquely with respect to the displacement direction of seat 7, with the result that receiving compartment 8 pivots in the direction of the first operating position thereof.

If it is also provided, in this case, to arranged vertical axis 12, inclined at a certain angle "α," the axis also naturally being arranged at an incline toward the front of the vehicle counter to the aforementioned line of vision of the vehicle occupant. Once again, aforementioned angle "α" is preferably oriented at a defined angle of inclination or a defined range of angles of inclination of the backrest of the relevant seat 7.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. A motor vehicle comprising:
a receiving compartment, which is mounted on a vehicle console, pivotable around a vertical axis in an area of a side wall of the vehicle console delimiting an occupant footwell of the motor vehicle, the receiving compartment being movable back and forth from a first operating position, in which it is arranged within an opening in the side wall of the vehicle console, into a second operating position, in which the receiving compartment projects into the occupant footwell,
wherein, with regard to a line of vision, oriented in the vehicle longitudinal direction of a vehicle occupant located on a seat of the motor vehicle assigned to the relevant occupant footwell, the vertical axis is arranged on an end of an end section of the receiving compartment situated counter to the line of vision, and
wherein the receiving compartment is mounted on the vehicle console to be pivotable around the vertical axis and is positioned in an open state such that the open receiving compartment is oriented obliquely with respect to a displacement direction of the aforementioned seat.

2. The motor vehicle according to claim 1, wherein the receiving compartment is configured to receive an electronic mobile device.

3. The motor vehicle according to claim 1, wherein the vertical axis is arranged inclined at an angle "α," counter to the line of vision of the vehicle occupant.

4. The motor vehicle according to claim 3, wherein the angle "α" is selected such that a line of sight of the vehicle occupant located on the seat of the motor vehicle, which is assigned to the aforementioned occupant footwell, is directed into the interior of the receiving compartment and/or onto an electronic mobile device held therein.

5. The motor vehicle according to claim 3, wherein the angle "α" is selected as a function of a defined angle of inclination or a defined range of angles of inclination of a backrest of the seat.

6. The motor vehicle according to claim 3, wherein the vertical axis is arranged, inclined at an angle "α" of 55° to 65°, or 60°, from the vertical, counter to the aforementioned line of vision of the vehicle occupant.

7. The motor vehicle according to claim 1, wherein the receiving compartment has a cover on the occupant footwell side, which runs flush with the side wall of the vehicle console in the first operating position of the receiving compartment.

8. The motor vehicle according to claim 7, wherein the cover has a cushion element on the occupant footwell side or is formed by a cushion element.

9. The motor vehicle according to claim 1, wherein a locking pushbutton is assigned to the receiving compartment, which is operatively connected to a locking device of the receiving compartment.

10. The motor vehicle according to claim 9, wherein the locking pushbutton is arranged in the motor vehicle at a distance from the receiving compartment.

11. A motor vehicle comprising:
a receiving compartment, which is pivotably mounted on a vehicle console in an area of a side wall of the vehicle console delimiting an occupant footwell of the motor vehicle and a cover having an upper edge and a lower edge as well as at least one side edge, the receiving compartment being movable back and forth from a first operating position, in which it is arranged within an opening in the side wall of the vehicle console, and the opening is closed by the cover, into a second operating position, in which the receiving compartment projects into the occupant footwell,
wherein the receiving compartment is mounted on the vehicle console, pivotable around a pivot or vertical axis, the pivot or vertical axis running or being arranged obliquely with respect to at least one side edge of the cover.

\* \* \* \* \*